(12) United States Patent
Meyer et al.

(10) Patent No.: US 12,224,515 B2
(45) Date of Patent: Feb. 11, 2025

(54) CABLE LUG DEVICE AND METHOD FOR MOUNTING A CABLE LUG DEVICE

(71) Applicant: NKT HV Cables AB, Lyckeby (SE)

(72) Inventors: Stephan Meyer, Brake (DE); Peter Müller, Nordenham (DE); Marcel Benjamin Grauerholz, Nordenham (DE); Björn Spiers, Schwanstetten (DE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 18/546,139

(22) PCT Filed: Feb. 15, 2022

(86) PCT No.: PCT/EP2022/053677
§ 371 (c)(1),
(2) Date: Aug. 11, 2023

(87) PCT Pub. No.: WO2022/175266
PCT Pub. Date: Aug. 25, 2022

(65) Prior Publication Data
US 2024/0088593 A1    Mar. 14, 2024

(30) Foreign Application Priority Data
Feb. 16, 2021   (EP) ..................... 21157388

(51) Int. Cl.
*H01R 13/187* (2006.01)
*H01R 4/30* (2006.01)
*H01R 13/17* (2006.01)

(52) U.S. Cl.
CPC ............ *H01R 13/187* (2013.01); *H01R 4/30* (2013.01); *H01R 13/17* (2013.01)

(58) Field of Classification Search
None
See application file for complete search history.

(56) References Cited

U.S. PATENT DOCUMENTS

| 4,678,210 | A | * | 7/1987 | Balsells | .................. | F16B 21/18 |
| | | | | | | 285/306 |
| 4,857,021 | A | * | 8/1989 | Boliver | .................. | H01R 13/53 |
| | | | | | | 439/813 |

(Continued)

FOREIGN PATENT DOCUMENTS

| WO | 0191239 A1 | 11/2001 |
| WO | 2006120624 A1 | 11/2006 |

OTHER PUBLICATIONS

European Search Resport; Application No. 21157388.6; Completed: Jul. 14, 2021; Mailing Date: Jul. 23, 2021; 15 Pages.

(Continued)

*Primary Examiner* — Ross N Gushi
(74) *Attorney, Agent, or Firm* — Whitmyer IP Group LLC (57) ABSTRACT

An emergency break cable lug device is described. The cable lug device includes a pin element for fixing a cable; and a socket element, in which the pin element is insertable and which is configured to be connected to an external conductor, in particular an external cable or wire. The pin element is adapted to exit the socket element upon a predefined threshold value of force acting on the pin element and/or the socket element. Further, a pin element for a cable lug device, a socket element for a cable lug device and a method for mounting a cable lug device are described.

7 Claims, 3 Drawing Sheets

(56) References Cited

U.S. PATENT DOCUMENTS

| | | | | |
|---|---|---|---|---|
| 5,421,750 | A * | 6/1995 | Crotty | H01R 13/53 439/801 |
| 6,520,795 | B1 * | 2/2003 | Jazowski | H01R 4/56 439/801 |
| 6,726,510 | B2 * | 4/2004 | Norbert | H01R 11/12 439/810 |
| 6,827,597 | B1 * | 12/2004 | Metzbower | H01R 13/502 439/475 |
| 6,991,484 | B2 * | 1/2006 | Luzzi | H01R 13/53 174/74 A |
| 7,168,983 | B2 * | 1/2007 | Graf | H01C 7/126 439/606 |
| 7,431,599 | B2 * | 10/2008 | Luzzi | H01R 13/53 174/74 A |
| 7,517,260 | B2 * | 4/2009 | Luzzi | H01R 13/53 439/801 |
| 7,588,469 | B2 * | 9/2009 | Luzzi | H01R 13/53 439/639 |
| 7,878,849 | B2 * | 2/2011 | Hughes | H02G 15/18 439/578 |
| 7,938,682 | B2 * | 5/2011 | Su | H01R 13/53 439/587 |
| 7,958,631 | B2 * | 6/2011 | Hughes | H02G 15/18 29/857 |
| 7,985,093 | B2 * | 7/2011 | Luzzi | H01R 13/641 439/921 |
| 8,018,707 | B2 * | 9/2011 | Yaworski | H01R 13/443 361/127 |
| 8,043,102 | B2 * | 10/2011 | Lu | H01R 13/53 439/181 |
| 8,308,167 | B2 * | 11/2012 | Balsells | H01R 13/2421 403/372 |
| 8,408,925 | B2 * | 4/2013 | Borgstrom | H01R 13/53 439/181 |
| 8,602,800 | B2 * | 12/2013 | Borgstrom | H01R 13/53 439/181 |
| 8,851,939 | B2 * | 10/2014 | Bazenas | F16F 1/045 439/840 |
| 9,112,322 | B2 * | 8/2015 | Siebens | H01R 13/17 |
| 9,293,872 | B2 * | 3/2016 | Mikli | H01R 13/6315 |
| 9,350,123 | B2 * | 5/2016 | Siebens | H01R 4/58 |
| 9,385,493 | B2 * | 7/2016 | Maroney | H01R 4/50 |
| 9,482,255 | B2 * | 11/2016 | Changsrivong | F16B 21/186 |
| 9,620,903 | B2 * | 4/2017 | Joo | H02G 15/06 |
| 9,677,587 | B2 * | 6/2017 | Changsrivong | F16B 21/186 |
| 9,829,028 | B2 * | 11/2017 | Changsrivong | F16B 21/073 |
| 9,882,332 | B2 * | 1/2018 | Frederick | H01R 43/26 |
| 10,186,805 | B2 * | 1/2019 | DeWitt | H01R 13/641 |
| 10,263,379 | B2 * | 4/2019 | Wang | H01R 13/41 |
| 10,347,403 | B2 * | 7/2019 | Luzzi | H01C 7/12 |
| 10,447,000 | B2 * | 10/2019 | Frederick | H01R 43/26 |
| 10,472,901 | B2 * | 11/2019 | Engel | E21B 17/028 |
| 10,634,181 | B2 * | 4/2020 | Montague, Jr. | H01R 4/4863 |
| 10,655,665 | B2 * | 5/2020 | Balsells | F16B 21/18 |
| 10,965,055 | B2 * | 3/2021 | Kompa | H01R 13/6271 |
| 11,295,879 | B2 * | 4/2022 | Kumar | H01C 7/12 |
| 11,699,886 | B2 * | 7/2023 | Fong | H02B 1/20 439/652 |
| 12,021,332 | B2 * | 6/2024 | Yaworski | H01R 13/6683 |
| 2002/0122690 | A1 * | 9/2002 | Poon | F16B 21/18 403/326 |
| 2004/0137771 | A1 * | 7/2004 | Schumacher | H01R 13/187 429/178 |
| 2011/0124245 | A1 * | 5/2011 | Fujita | H01R 13/2421 439/840 |
| 2012/0021635 | A1 | 1/2012 | Tiegs et al. | |
| 2013/0149029 | A1 * | 6/2013 | Changsrivong | A61N 1/3752 403/361 |
| 2018/0138633 | A1 | 5/2018 | Dewitt et al. | |
| 2020/0099161 | A1 | 3/2020 | Ward | |
| 2022/0344868 | A1 * | 10/2022 | Hughes | H01R 11/26 |
| 2024/0030651 | A1 * | 1/2024 | Luzzi | H01R 13/53 |
| 2024/0178645 | A1 * | 5/2024 | Yaworski | H02G 15/188 |

OTHER PUBLICATIONS

International Preliminary Report on Patentability; Application No. PCT/EP2022/053677; Completed: May 26, 2023; 17 Pages.

PCT International Search Report and Written Opinion of the International Searching Authority; Application No. PCT/EP2022/053677; Completed: Mar. 29, 2022; Mailing Date: Apr. 7, 2022; 20 Pages.

Written Opinion of the International Preliminary Examining Authority; Application No. PCT/EP2022/053677; Mailing Date: Jan. 23, 2023; 9 Pages.

* cited by examiner

CABLE LUG DEVICE AND METHOD FOR MOUNTING A CABLE LUG DEVICE

TECHNICAL FIELD

The present disclosure relates to a cable lug device, a pin element and a socket element for a cable lug device. In particular, the present disclosure relates to a cable lug device for HV applications, more specifically for HV applications in offshore wind turbine installations. Further aspects of the present disclosure relate to a method for mounting a cable lug device, particularly a method for mounting a cable lug device having a pin element and a socket element, and more particularly to a method for mounting a cable lug device for HV applications in offshore wind turbines.

TECHNICAL BACKGROUND

In recent years, environmentally sustainable power generation became increasingly relevant. For instance, wind turbines are suitable for sustainable power generation, and are especially effective in offshore installations. However, floating and stationary offshore applications come with several additional parameters, which have to be considered when designing the wind turbine, the platform, the cable run, the kind of cables used, connections between elements and cables, the environmental conditions, like sea water and the swell of the sea, and so on. In particular, the connection between cables is especially demanding in offshore applications, since the single elements of an offshore installation may move in and with the sea.

For instance, two or more wind turbines of an offshore installation may be connected to each other by cables, and/or each of the wind turbines may be connected to a platform carrying a voltage transformation substation. If bad environmental conditions appear, such as a storm, an unforeseen swell, an earthquake or the like, the cable connection between the single elements of an offshore application may break and may cause severe damage. For instance, the cables may get tangled up with all consequences of an unforeseen contact between current-carrying cables. In other scenarios, the connector, or another part of the cable connection may break up. In any case, repairing such damages is difficult, especially in offshore installations. Additionally, the cables may intentionally be disconnected for replacement and maintenance reasons onto floating wind turbines.

Especially cable to cable connections should be protected against severe damage in a wind turbine installation, and should allow an easy disconnection of the cables for replacement and maintenance reasons. Cable to cable connections are often realized by cable lugs allowing an electrical connection between two current carrying conductors. Some cable lugs are known using plug connections of the cables, other cable lugs use screw fastening for the cables to be connected. However, none of the known cable lugs is able to protect the cables, the connectors and/or the bushings in case of an emergency, or allow an easy disconnection for repair and maintenance.

SUMMARY

It is therefore an object of the present disclosure to overcome at least some of the above-mentioned problems in the prior art.

In view of the above, an emergency break cable lug device includes a pin element for fixing a cable; and a socket element, in which the pin element can be inserted and which is configured to be connected to an external conductor, in particular an external cable or wire. The pin element exits the socket element upon a predefined threshold value of force acting on the pin element and/or the socket element.

According to an aspect of the present disclosure, an emergency break cable lug device includes a pin element for fixing a cable; and a socket element, in which the pin element can be inserted and which is configured to be connected to an external conductor, in particular an external cable or wire. According to some embodiments, the cable lug device further includes a sacrifice element breaking up upon a predefined threshold value of force acting on the pin element and/or the socket element and effecting a release of the pin element out of the socket element.

According to an aspect of the present disclosure a pin element for an emergency break cable lug device including the pin element and a socket element according to embodiments described herein is described. The emergency break cable lug device is an emergency break cable lug device according to embodiments described herein. The pin element includes a fixing part for fixing a cable to the pin element; and a pinning part being configured to be inserted in a respective receiving part of the socket element of the cable lug device.

According to a further aspect of the present disclosure, a socket element for an emergency break cable lug device including the socket element and a pin element according to embodiments described herein is described. The emergency break cable lug device is a cable lug device according to embodiments described herein. The socket element according to embodiments described herein includes a receiving part configured for receiving a pinning part of the pin element of the cable lug device; and a palm part for electrically connecting the socket element to an external conductor, in particular an external cable or wire.

According to an aspect of the present disclosure, a method for mounting an emergency break cable lug device having a pin element and a socket element is described. The method includes inserting the pin element into the socket element for forming the emergency break cable lug device, and providing at least one elastic element between the pin element and the socket element for allowing the pin element exiting the socket element upon a predefined threshold value of force acting on the pin element and/or the socket element.

Further advantages, features, aspects and details that can be combined with embodiments described herein are evident from the dependent claims, claim combinations, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can be applied to a corresponding part or aspect in another embodiment as well.

According to embodiments described herein, a cable lug device is a device by which two electrical conductors can be connected, especially electrically connected. In particular, a cable lug device is a device for connecting two cables with each other; especially a cable lug device is a device for electrically connecting two cables with each other. Typically, a cable lug device has a receiving part, in which a first cable can be inserted and fixed. Further, a cable lug device also has a contacting part, which is contacted by a second cable, the contacting part being e.g., in the form of a loop part or an eye part. Typically, the loop can either contact the second conductor with a plane or the second conductor may be passed through the "hole" of the loop.

A cable lug device according to embodiments described herein is an emergency break cable lug device. That means that the cable lug device has an emergency break function for the case of an emergency (as for instance mentioned above for offshore wind turbine installations: storm, high swell, earthquake and the like). In some embodiments, the emergency break function may be used for (intentionally) disconnecting the cables, e.g., for replacement or maintenance reasons. In particular, with the emergency break cable lug device according to embodiments described herein, a cable connected to the cable lug device according to embodiments described herein can be pulled out of the cable lug device without damage, in particular without damaging the cables, the bushings, and/or a connector device. Typically, the cable lug device according to embodiments described herein will give the cable free, if a force on the cable and/or the cable lug device is above a defined threshold value, especially a tension force.

According to embodiments described herein, the emergency break cable lug device allows pulling out the cable without severe damage by providing a pin element and a socket element, wherein the pin element can be inserted into the socket element to form the cable lug device according to embodiments described herein. A pin element as referred to in embodiments described herein may be understood as a pin-like element or a bolt-like element being adapted for being inserted in a socket element to form a cable lug device. A socket element as referred to in embodiments described herein may be understood as a socket-like element or a sleeve-like element being adapted for receiving the pin element for forming the cable lug device according to embodiments described herein. Typically, both the pin element and the socket element may be adapted to fit to each other and hold each other (especially up to a predefined force acting on the cable lug device). Typically, further elements may be provided between the pin element and the socket element, and respective receiving parts may be provided in one of the pin element and the socket element, or both.

Figure 1A:
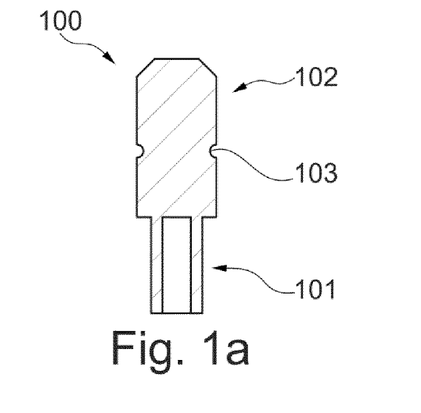
FIGS. 1a to 1f show schematic cross-sectional views of different pin elements according to embodiments described herein.

FIG. 1a shows an embodiment of a pin element 100 as described herein. The pin element 100 is a pin element for an emergency break cable lug according to embodiments described herein. The pin element 100 includes a fixing part 101 for fixing a cable to the pin element 100. Typically, the fixing part 101 of the pin element 100 may have a substantially tube-like shape or cylinder-like outer shape having a round basis area, or a polygon-like basis area, such as a hexagonal basis area. According to some embodiments, which may be combined with other embodiments described herein, the fixing part 101 may be adapted for fixing a cable to the fixing part 101 by crimping (resulting e.g., in a press fit of the cable in the fixing part 101) or/and screwing.

Figure 1B:
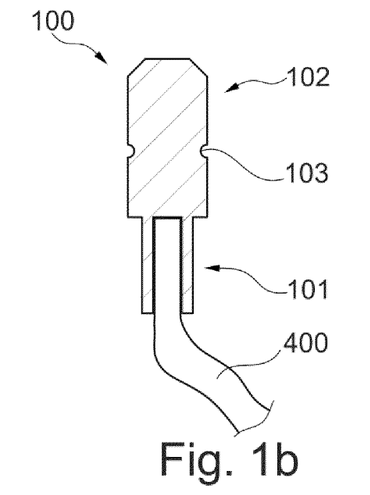

FIG. 1b shows the pin element 100 according to FIG. 1a having a cable 400 fixed to the fixing part 101 of the pin element.

Figure 2A:
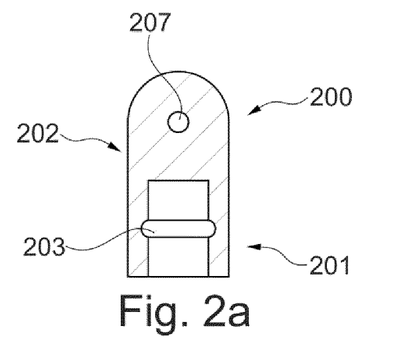
FIGS. 2a to 2c show schematic cross-sectional views of different socket elements according to embodiments described herein.
Figure 2B:
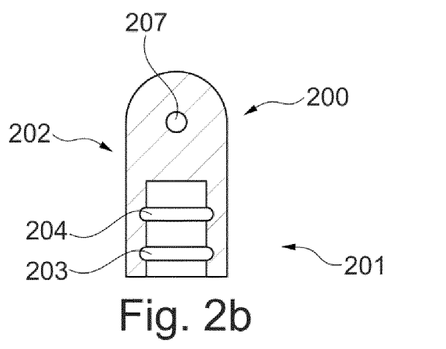
Figure 2C:
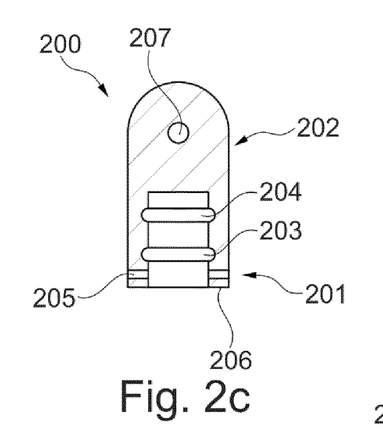

The pin element 100 according to embodiments described herein further includes a pinning part 102, which is configured to be inserted in a respective receiving part 201 of the socket element 200, as shown in FIGS. 2a to 2c explained in detail below. In particular, the pinning part 102 may have a bolt-like shape or a plug-like shape. The pinning part 102 being configured for being received by the receiving part 201 of a socket element 200 according to embodiments described herein may be adapted by size and shape to fit in the receiving part of the socket element, in particular adapted by length, diameter, surface (such as surface material, surface roughness, surface quality), material, fitting shape, receptacles, notches, threads and the like.

In the embodiment of the pin element 100 shown in FIG. 1a, a receptacle, in particular an elastic element receptacle 103 for an elastic element, such as a spring-like element, is provided. According to some embodiments, the elastic element receptacle may be a notch or notch area. Two elastic elements 500, 501 are exemplarily shown in the embodiment shown in FIG. 1f. For instance, the spring-like element may be a spring. According to some embodiments, the elastic element may be a specifically wound device made of an elastic material, such as metal. In some embodiments, which may be combined with other embodiments described herein, the elastic element may be wound in an angular or inclined manner. In some embodiments, which may be combined with other embodiments described herein, the elastic element may be made from a first elastic material, such as a metal (e.g., copper) and may be coated with a second material. According to some embodiments, the elastic element may be made from one (or two) electrically conducting material(s).

Typically, the elastic element as described herein may be provided between the pin element 100 and the socket element 200 according to embodiments described herein. More typically, the elastic element as described herein may be provided between a pin element and a socket element of the cable lug device for increasing or ensuring an electrical contact between the pin element and the socket element. According to some embodiments described herein, the elastic elements provide a sliding contact securing the current flow, especially the current flow between the pin element and the socket element of the cable lug device according to embodiments described herein. The elastic element being provided between the pin element and the socket element may be in contact with both, the pin element and the socket element.

Additionally or alternatively, the elastic element 500, 501 placed between the pin element 100 and the socket element 200 may be provided as a holding element or clamping element for increasing or ensuring a proper halt of the pin element in the socket element. In some embodiments, the elastic element provides a suitable elasticity or tension force. For instance, the elastic element being provided between the pin element and the socket element may be designed and adapted (e.g., by size, shape, and/or material(s)) to perform a holding function, in particular to perform the holding function up to a predefined force (e.g., a tensile force) acting on the cable fixed to the fixing part 101 of the pin element 100 or the cable lug device. In some embodiments, the elastic element holds the pin element 100 in the socket element 200 up to a predefined threshold value of force acting on the pin element 100 and/or the socket element and/or the cable being fixed to the fixing part 101 of the pin element 100. According to some embodiments described herein, when a force exceeding the predefined threshold value acts on the cable lug device, the pin element is no longer held in the socket element, e.g., due to a break of the elastic element. For instance, the predefined threshold value for a break of the connection between the pin element and the socket element by the elastic element may be adjusted by adapting the size, shape, or material of the elastic element.

For instance, the elastic element being adapted for breaking at a predefined threshold value of force acting on the cable fixed to the fixing part 101 of the pin element 100 (or on the socket element of the emergency break cable lug device), may break in case of an emergency exceeding the predefined threshold value of force (e.g., due to a storm, or swell acting on the cable of an offshore installation) and may release the connection between the pin element 100 and the socket element 200 of the cable lug device according to embodiments described herein. According to some embodiments, the pin element 100 may additionally or alternatively be halted in the socket element by a fastening device, such as a shear off fastening device, as will be described in detail below. In some embodiments, the cable lug device according to embodiments described herein has a sliding (electrical) contact (typically between pin element and socket element, more typically provided by an elastic element) and a fastening device with shear off function.

Figure 1C:
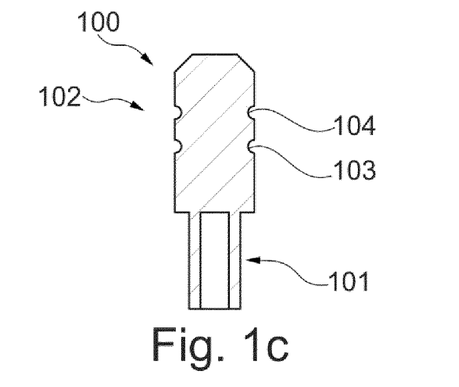

FIG. 1c shows an embodiment of the pin element 100 having two elastic element receptacles 103, 104, which may for instance be two notches acting in particular as a receptacle for two elastic elements as described in detail above. According to some embodiments, the number of elastic elements (and thus the number of elastic element receptacles in the pin element 100 of the cable lug device) may be chosen according to the respective application and the operational conditions of the application. As an example, the pin element may typically provide more than 1 elastic element receptacle, more typically more than 2 elastic element receptacles, and even more typically more than 3 elastic element receptacles.

Figure 1D:
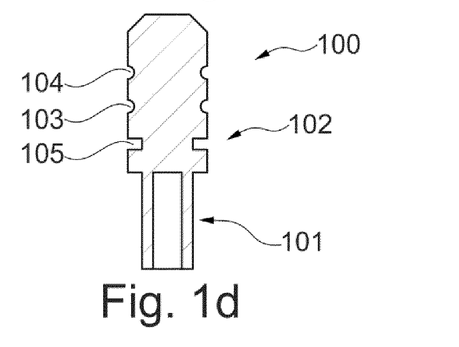

FIG. 1d shows an embodiment of a pin element 100 for a cable lug device according to some embodiments described herein. The pin element 100 as shown in the example of FIG. 1d provides a fastening device receptacle 105 for a fastening device, such as a screwing device, in particular a shear off screwing device. Typically the pin element 100 as exemplarily shown in FIG. 1d also provides two elastic element receptacles 103, 104 for elastic elements as described above. According to some embodiments, the fastening device, which may be placed in the fastening device receptacle 105 of the pin element 100, may provide a holding function between the pin element 100 and the socket element 200. The holding function of the fastening device may be provided additionally or alternatively to a holding function of one or more elastic elements. Especially, the fastening device is described in detail below with respect to the socket element and the cable lug device according to embodiments described herein.

Figure 1E:
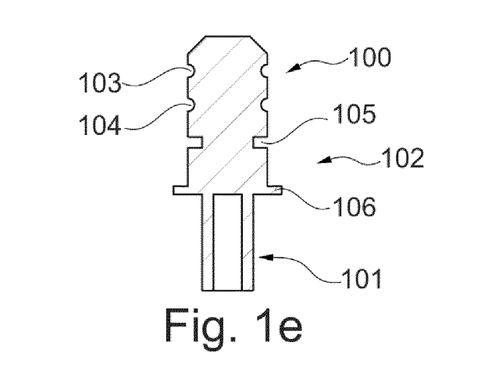

FIG. 1e shows a pin element 100 according to some embodiments described herein. The pin element 100 of FIG. 1e has two elastic element receptacles 103, 104 for an elastic element (as for instance described above), and a fastening device receptacle 105 for a fastening device. According to some embodiments, which may be combined with other embodiments described herein, the pin element 100 of FIG. 1e has a pin stopper part 106 with a contact area for standing in contact with a respective area of the socket element, when assembled together to a cable lug device according to embodiments described herein. Typically, the pin stopper part 106 may act as an assembling aid, or an additional contact area for the pin element and the socket element when assembled. For instance, the pin stopper part may stop movements of the pin element 100 into the socket element 200 and may ensure a proper function of the elastic elements and/or the fastening device (in particular by limiting a force acting as a compressive force onto the pin element 100 in direction of the socket element 200).

Figure 1F:
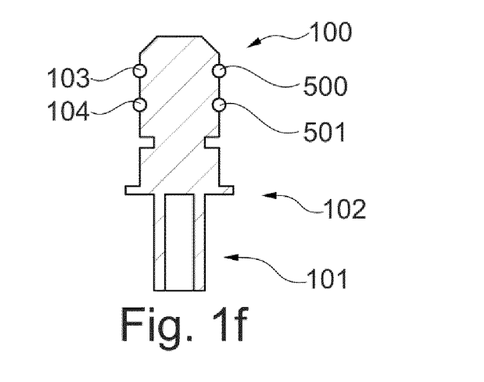

FIG. 1f shows an embodiment of the pin element 100 as exemplarily shown in FIG. 1e. The pin element 100 of FIG. 1e additionally shows examples of two elastic elements 500, 501, in particular in the elastic element receptacles 103, 104 of the pin element 100 according to embodiments described herein. The elastic elements 500, 501 shown in FIG. 1f may be elastic elements as described above.

FIG. 2a shows a socket element 200 for an emergency break cable lug device according to embodiments described herein. The socket element 200 includes a receiving part 201 configured for receiving a pinning part 102 of the pin element 100, typically a pinning part of a pin element 100 as described in embodiments above, and more typically a pinning part with one or more elastic elements mounted thereon. According to some embodiments, the receiving part 201 may be adapted by size, shape, surface properties and material to the pinning part 101 of the pin element 100. For instance, the receiving part 201 may be adapted so that a pin element 100 with one or more elastic elements mounted to the pin element 100 can be inserted in the receiving part 201 of the socket element. According to some embodiments, which can be combined with other embodiments described herein, the one or more elastic element may be designed and adapted that the elastic element(s) may partially be compressed for the montage so that the pin element together with the (one or more) elastic element can be inserted in the receiving part of the socket element 200. As can be seen in FIG. 2a, the receiving part 201 of the socket element 200 can be provided with at least one first receiving receptacle 203 (such as a notch or notch area). The at least one first receiving receptacle 203 of the socket element 200 may be adapted to carry the elastic element 500 together with the elastic element receptacle 103 of the pin element 100. That is, the first receiving receptacle 203 of the socket element 200 and the elastic element receptacle 103 of the pin element 100 hold the elastic element 500 between the pin element

100 and the socket element 200. In particular, the first receiving receptacle 203 of the socket element 200 and the elastic element receptacle 103 of the pin element 100 form together a gap or a cavity for the elastic element.

The socket element 200 according to embodiments described herein further includes a palm part 202 for electrically connecting the socket element 200 to an external conductor 600, in particular an external cable or wire. For instance, the palm part 202 of the socket element 200 according to embodiments described herein may provide a surface, by which an external conductor, such as a wire or cable, may electrically be contacted. In some embodiments, the palm part 202 of the socket element 200 may include a hole 207 for electrically contacting an external conductor, such as a wire or cable, especially by guiding the external conductor through the hole.

Figure 3:
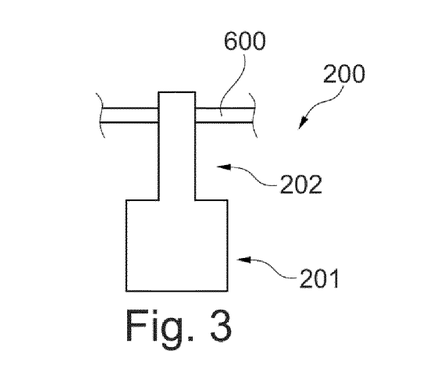
FIG. 3 shows a schematic side view of a socket element connected to an external cable according to an embodiment described herein.

FIG. 3 shows a side view of the socket element 200 according to some embodiments of the present disclosure. In the side view of the exemplary embodiment of FIG. 3, it can be seen that the palm part 202 contacts an external conductor 600 through the hole 207 shown in FIGS. 2a to 2c. Further, FIG. 3 shows that the receiving part 202 of the socket element 200 may have a cylinder-like shape in some embodiments, especially a hollow cylinder-like shape.

FIG. 2b shows an embodiment of the socket element 200, which may in particular correspond and fit to the embodiment of the pin element 100 shown in FIG. 1c. The socket element 200, and in particular the receiving part 202 of the socket element 200, provides in the embodiment shown in FIG. 2b two first receiving receptacles 203 and 204. Typically, the two first receiving receptacles 203 and 204 offer space for two elastic elements 500 and 501, as explained in detail above.

FIG. 2c shows a further embodiment of the socket element 200. The socket element 200 of FIG. 2c provides two first receiving receptacles 203 and 204 and, additionally, a second receiving receptacle 205 for a fastening device 700 for fastening the pin element 100 in the socket element 200 of the cable lug device according to embodiments described herein. According to some embodiments, which may be combined with other embodiments described herein, the second receiving receptacle 205 may be adapted for a fastening device, such as a screw, a bolt, a pin, or the like. According to some embodiments, which may be combined with other embodiments described herein, the fastening device (such as a fastening device 700 exemplarily shown in FIG. 4) provided in the second receiving receptacle 205 may be a fastening device with a shear off function, typically a screw, and more typically a shear bolt or shear screw. In particular, a fastening device including a shear off function allows breaking the screw (in some applications removing the screw head) after having fastened the fastening device. According to embodiments described herein, a fastening device with shear off function, such as a shear off screw, is capable of limiting a force, especially a tensile force, acting on the cable.

According to some embodiments, the fastening device with shear off function may be adapted to break at a predetermined threshold value of force, for instance, if tensile force acting on the pin element 100 placed in the socket element 200 and/or the socket element 200 becomes too large. Such a defined breaking point of the shear screw or shear bolt may support the emergency break function of the cable lug device according to embodiments described herein. In particular, the fastening device breaking at a predefined threshold value of force may allow the pin element 100 leaving the socket element 200 without severe damage of the respective parts (apart from the shear off screw). According to some embodiments described herein, a fastening device with shear off function may break at forces of typically between about 300 N and about 1200 N, more typically between about 400 N and about 1100 N, and even more typically between about 500 N and about 1000 N.

In other words, the fastening device may act as a holding element holding the pin element 100 in the socket element 200 during normal operation, either additionally or alternatively to the elastic element described above.

Going back to the embodiment of the socket device 200 shown in FIG. 2c, one can say that the socket element having a second receiving receptacle may be combined with different embodiments of pin elements 100. For instance, the socket element 200 of FIG. 2c may be combined with the pin element 100 shown in FIG. 1d having a fastening device receptacle 105 according to some embodiments described herein. That means that the fastening device 700 may be held by both the fastening device receptacle 105 of the pin element 100 and the second receiving receptacle 205 of the socket element. In some embodiments, the socket element 200 shown in FIG. 2c may be combined with a pin element 100 as for instance shown in FIG. 1c without a substantial fastening device receptacle. In this case, the fastening device may be used like a fastening and clamping device clamping the pin element within the socket element.

According to some embodiments, any combination of first and second receiving receptacles in the socket element may be used, as suitable for the respective application. For instance, any number of first receiving receptacles for elastic elements may be combined with any number of second receiving receptacles for fastening devices.

As can be seen in FIG. 2c, the embodiment of the receiving part 201 of the socket element shown may provide a socket stopper part 206 with a contact area for standing in contact with a respective stopper part or area 106 of the pin element 100, when assembled. According to some embodiments, the stopper part 106 of the pin element 100 and the stopper part 206 of the socket element 200 may allow a better assembly and a secure stop against compression forces acting on the pin element in direction of the socket element, as exemplarily explained with respect to FIG. 1e.

Figure 4:
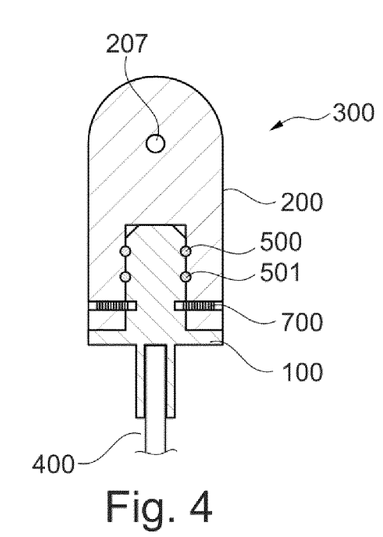
FIG. 4 shows a schematic cross-sectional view of a cable lug device according to embodiments described herein.

FIG. 4 shows a cable lug device according to embodiments described herein. The cable lug device 300 is an emergency break cable lug device and includes a pin element 100 for fixing a cable 400 and a socket element 200, in which the pin element 100 is insertable and which is configured to be connected to an external conductor 600, in particular an external cable or wire. Typically, the pin element 100 of the cable lug device 300 may be a pin element as described in embodiments above. Typically, the socket element 200 of the cable lug device 300 may be a socket element as described in embodiments above. The cable lug device 300 is designed and adapted so that the pin element 100 exits the socket element upon a predefined threshold value of force, especially a tensile force, acting on the pin element 100 and/or the socket element 200. Typically, the function of an exiting pin element of the cable lug device may be provided by an elastic element, as described in embodiments before and/or a respective fastening device as described in embodiments before (in particular a shear off screw, a shear off bolt or the like). For instance, the shape and size of the elastic element receptacles of the pin element 100 of the cable lug device and the parameters (such as size, shape and material) of the elastic element and/or the size and shape of the second receiving receptacle of the socket element and the parameters (such as size, shape, material, and shear off function) of the fastening device may contribute to the function of the cable lug device to fall into the single pieces pin element and socket element under defined circumstances. In some embodiments, the materials and the geometry of the pin element and the socket element may lead to the effect of the cable lug device falling into the single pieces at appearance of a predefined threshold value (especially without the need for an elastic element or a fastening device). For instance, the pin element and/or the socket element may be provided with geometric implementations, such as spikes or the like, for ensuring the emergency break function of the cable lug device.

According to some embodiments described herein, the function of separating the mounted parts of the cable lug device (i.e. at least the pin element and the socket element) may be triggered at a predefined threshold value of tensile force acting on the pin element and/or the socket element. In particular, a tensile force coming from the cable 400 fixed to the fixing part of the pin element 100 and/or a tensile force coming from an external conductor being in contact with the palm part of the socket element 200 may affect the separation of the pin element and the socket element.

According to some embodiments, which may be combined with other embodiments described herein, the pin element 100 and the socket element 200 may be made of an electrically conductive material, such as a metal. Typically, the pin element 100 and/or the socket element 200 may be made or may contain non-ferrous materials, in particular materials like copper, copper-alloys, aluminum, and/or aluminum alloys. According to some embodiments, the cable lug device 300 provides an electrically conducting path from the cable 400 fixed to the pin element 100 to an external conductor 600 being in contact with the socket element 200, in particular a palm part 202 of the socket element 200.

Figure 5:
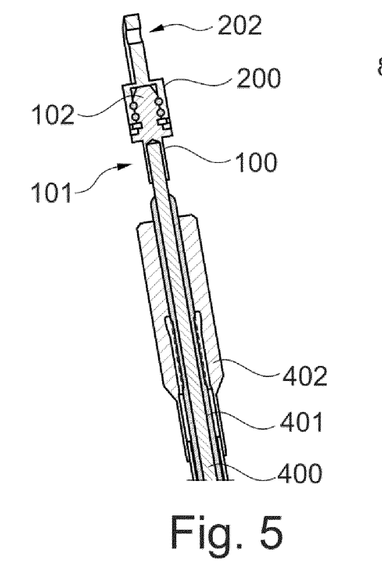
FIG. 5 shows a schematic cross-sectional view of a cable lug device with a cable connected thereto according to embodiments described herein.

FIG. 5 shows a cross-sectional view of an emergency break cable lug device according to some embodiments described herein. The cable lug device shown in FIG. 5 includes a pin element 100 and a socket element 200 with a palm part 202. A cable 400 is shown in FIG. 5 being fixed to the fixing part 101 of the pin element 100. The cable 400 (and the cables described herein) may typically be a high voltage cable (e.g., by size, shape, material and isolation). Generally, HV cables particularly may include a conductor, an insulating layer, shield wires, and an outer sheath. The cables described herein may in particular be cables suitable for offshore applications. According to some embodiments, the cable 400 fixed to the pin element 100 of the cable lug device may have a core insulation 401 and a stress cone 402.

In the context of the present disclosure, a high voltage (HV) is particularly to be understood as a voltage higher than 1 kV for alternating currents or higher than 1.5 kV for direct currents.

Figure 6:
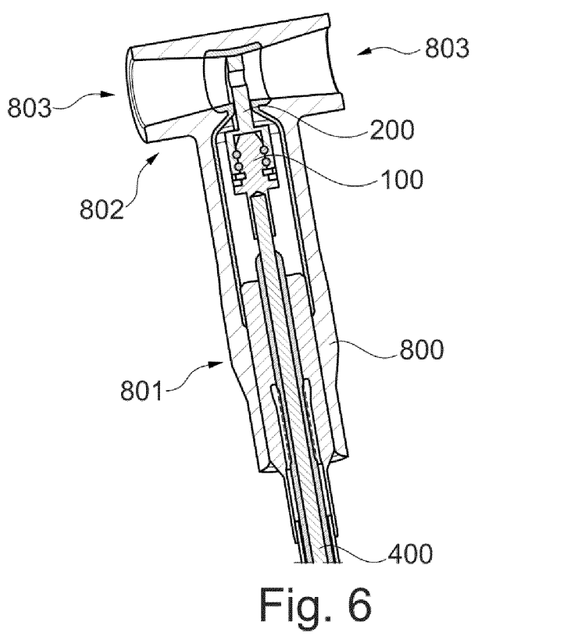
FIG. 6 shows a schematic cross-sectional view of a cable lug device in a connector device according to embodiments described herein.

FIG. 6 shows an embodiment of a cable lug device 300 having a pin element 100 and a socket element 200 being placed in a connector device 800. As can be seen in FIG. 6, a cable 400 is fixed to the pin element 100 of the cable lug device. According to some embodiments, the connector device 800 includes a receiving part 801 for receiving and housing the cable lug device and a part of the cable 400 according to embodiments described herein. Further, the connector device 800 may include a contact part 802 housing the palm part 202 of the socket element 200 of the cable lug device as described in embodiments described herein. Typically, the contact part 802 houses the palm part of the cable lug device and the external conductor, which may electrically be connected to the cable 400 fixed in the pin element 100 of the cable lug device. In some embodiments, the external conductor may be an external cable (such as cable 600 shown in FIG. 3) being guided through the hole 207 of the palm part 202 of the socket element 200 of the cable lug device 300. According to some embodiments, the contact part 802 of the connector device 800 may provide a path 803 for the external conductor to be connected to the cable fixed by the cable lug device.

With the emergency break cable lug device 300 according to embodiments described herein, a cable fixed to the cable lug device can be pulled out of the connector device 800 if a specific force (in particular a tensile force) on the cable 400 becomes to high.

Figure 7A:
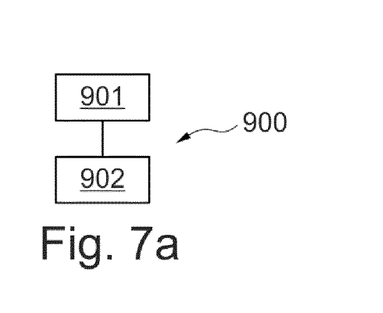
FIGS. 7a to 7b show a schematic flow chart of a method for mounting a cable lug device according to embodiments described herein.

According to some embodiments, a method is provided for mounting an emergency break cable lug device 300 having a pin element 100 and a socket element 200. Typically, the pin element 100 may be a pin element 100 as described in detail in embodiments above. Typically, the socket element 200 may be a socket element as described in detail in embodiments above. The method 900 is exemplarily shown as a flow chart in FIG. 7a. The method 900 according to embodiments described herein includes in block 901 inserting the pin element 100 into the socket element 200 for forming the emergency break cable lug device 300. In block 902, the method 900 according to embodiments described herein includes providing at least one elastic element 500 between the pin element 100 and the socket element 200 and/or a fastening device 700 between the pin element 100 and the socket element 200. The elastic element between the pin element and the socket element allows or enables, as described in detail above, that the pin element 100 exits the socket element 200 upon a predefined threshold value of force acting on the pin element 100 and/or the socket element 200. In particular, the force causing a separation of the pin element and the socket element of the cable lug device may be a tensile force, especially a tensile force acting on a cable being fixed to the pin element of the cable lug device (as for instance shown in FIG. 1b) and/or a tensile force acting on the socket element of the cable lug device (for instance via the palm part of the socket element). According to some embodiments, the elastic element provided between the pin element and the socket element may be a sliding electrical contact, especially for ensuring the current flow, especially the current flow between the pin element and the socket element of the cable lug device according to embodiments described herein.

Additionally or alternatively, the pin element and the socket element may be adapted (such as by shape, geometrical implementations such as spikes or the like, material, or surface properties, such as surface roughness) to be separated at appearance of a predefined threshold value of force acting on the cable lug device.

According to some embodiments, which may be combined with other embodiments described herein, an elastic element (e.g., a spring element as described above) may be mounted to the pin element 100 before the pin element 100 is inserted into the socket element 200 for forming the cable lug device 300 according to embodiments described herein. FIG. 1f shows an example of a pin element 100 being equipped with two elastic elements 500, 501 before being inserted into a socket element of a cable lug device.

Figure 7B:
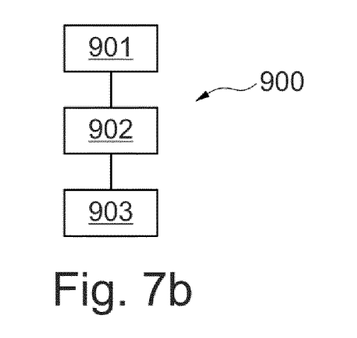

In some embodiment, the method 900 as schematically shown in FIG. 7b includes in block 903 connecting (especially electrically connecting) at least a first cable 400 and a second cable or an external conductor 600 to each other with the cable lug device 300. In particular, the first cable 400 may be fixed to the pin element 100 (especially the fixing part 101 of the pin element 100 as exemplarily described above). Typically, the second cable or external conductor 600 may be connected (or be in electrically conductive contact) with the socket element, in particular the palm part of the socket element of the cable lug device (as exemplarily shown in FIG. 3). According to some embodiments, which may be combined with other embodiments described herein, the pin element and the socket element being made from an electrically conductive material and being additionally connected via the elastic element 500 offer an electrically conductive path from the first cable 400 through the pin element 100 further through the socket element 200 to the second cable or external conductor 600.

According to some embodiments, which may be combined with other embodiments described herein, the method may further include fixing the first cable 400 to the fixing part 101 of the pin element 100 and aligning the palm part 202 of the socket element 200 to the second cable or external conductor 600. Typically, the aligning may be performed after the pin element 100 has been inserted in the socket element 200, and in particular before a fastening device (if any) is inserted in the respective receptacle (s) of the socket element and the pin element. Typically, the pin element 100 is rotatable within the socket element (especially before a fastening device is applied). A heavy offshore cable being connected to a known cable lug cannot be rotated for aligning the palm to a connector device. The cable lug device according to embodiments described herein (and especially the respective mounting method) allows a rotation and, typically, an alignment of the cable lug device to the second cable or external conductor 600 after having fixed the first cable 400 to the cable lug device 300 according to embodiments described herein. In particular, the cable lug device according to embodiments described herein enables a rotation of the pin element within the socket element (typically at least in a mounting stage and, more typically, before a fastening device is applied). This improves the montage of the cable lug device according to embodiments described herein, particularly of a cable lug device for high voltage applications, and even more particularly of a cable lug device for offshore applications.

According to some embodiments, the method may further include providing a fastening device in a second receiving receptacle of the socket element of the cable lug device. Typically, the fastening device may also be provided in a fastening device receptacle of the pin element of the cable lug device. As described in detail above, the fastening device may be a fastening device with a shear off function, which typically breaks up at appearance of a predefined force. The fastening device with a shear off function limits the force, especially the tensile force, acting on the cable lug device according to embodiments described herein or on one of the cable connected by the cable lug device.

In some embodiments, the method may further include connecting the cable lug device 300 to or into a connector device, such as a connector device 800 exemplarily shown in FIG. 6. Typically, the connector device is pushed over the cable lug device onto the stress cone of the cable 400. Typically, once the cable lug device according to embodiments described herein is placed in the connector device (more typically with a first cable fixed to the cable lug device), an external conductor, such as a second cable may be put in contact with the palm part 202 of the socket element 200 of the cable lug device. For instance, a second cable may be guided through the path 803 of the connector device for being electrically connected to the cable lug device according to embodiments described herein.

Before the pin element is inserted into the socket element to form a cable lug device according to embodiments described herein, the cable 400 may be prepared, e.g., by pushing on a stress cone, especially onto the core insulation of the cable 400. Further, the pin element 100 may be pushed onto the cable 400 and fixed to it, e.g., by crimping, especially hexagonal crimping, or by screwing or the like. When pushing the socket element over the pin element (typically carrying one or more elastic elements), the elastic elements may catch with the socket and are placed in the first receiving receptacle(s) of the socket element (as e.g., explained in detail above). The connector device may further be pushed onto a bushing and fixed to it.

According to embodiments described herein, the cable lug device and the single elements of it as well as the method for mounting a cable lug device allows an easy separation of the electrically conductive connection provided by the cable lug device. In particular, the separation of the pin element and the socket element upon acting of a predefined force prevents the breakage of parts of the cable lug device, the connector, the bushing or the cable. Instead, sacrifice elements are provided, such as elastic elements between the pin element and the socket element, or a fastening device with shear off function, as described in detail above. This prevents severe damage at main parts of the cable-to-cable connection offered by a cable lug device. Also, the repair is simple by replacing the sacrifice elements, such as the elastic elements and/or the fastening device, and push the different parts of the cable lug together again.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:
1. A connector device comprising:
a body including a first channel for receiving a cable, and a second channel perpendicular to the first channel for receiving an external conductor, the first channel opening into the second channel; and
a connector device comprising:
a pin element;
a socket element;
wherein the pin element includes:
 a fixing part for fixing the cable to the pin element; and
 a pinning part;
wherein the socket element includes:
 a receiving part configured for receiving the pinning part of the pin element of the cable lug device;
 a palm part for electrically connecting the socket element to the external conductor,
 wherein the receiving part of the socket element includes at least one first receiving receptacle;
at least one elastic element held between at least one elastic element receptacle of the pin element and a first receiving receptacle of the socket element, the at least one elastic element electrically connecting the pin element to the socket element of the connector device and/or the at least one elastic element for holding the pin element in the socket element of the connector device, wherein the at least one first receiving receptacle is placed and adapted to hold the at least one elastic element together with the at least one elastic element receptacle of the pin element; and a fastening device for fastening the pin element to the socket element, wherein the fastening device is held in a second receiving receptacle of the socket element; and wherein the fastening device is a fastening device with shear off function, wherein the pin element exits the socket element upon a predefined threshold value of force acting on the pin element and/or the socket element, wherein the pin element and the receiving part are arranged in the first channel, and the palm part extends from the first channel into the second channel.

2. The connector device according to claim 1, wherein the cable lug is adapted to provide an electrical contact from the cable fixed to a fixing part of the pin element via a palm part of the socket element to an external conductor being in contact with the palm part of the socket element.

3. The connector device according to claim 1, wherein the connector device is a device for connecting two or more wires or cables with each other.

4. The connector device according to claim 1, wherein the connector device is a cable lug device for high voltage applications, in particular for high voltage applications with a voltage equal to or greater than 1 kV.

5. The connector device according to claim 1, wherein the socket part has a loop part, an eye, or a hole for electrically contacting an external conductor.

6. A method for mounting a connector device, the connector device having:
   a body including a first channel for receiving a cable, and a second channel perpendicular to the first channel for receiving an external conductor, the first channel opening into the second channel; and
   an emergency break cable lug device, which comprises:
   a pin element, wherein the pin element includes:
      a fixing part for fixing the cable to the pin element; and
      a pinning part;

a socket element, wherein the socket element includes:
   a receiving part configured for receiving the pinning part of the pin element of the cable lug device;
   a palm part for electrically connecting the socket element to the external conductor,
   wherein the receiving part of the socket element includes at least one first receiving receptacle;
at least one elastic element held between at least one elastic element receptacle of the pin element and a first receiving receptacle of the socket element, the at least one elastic element electrically connecting the pin element to the socket element of the emergency break cable lug device and/or the at least one elastic element for holding the pin element in the socket element of the emergency break cable lug device,
wherein the at least one first receiving receptacle is placed and adapted to hold the at least one elastic element together with the at least one elastic element receptacle of the pin element; and
a fastening device for fastening the pin element to the socket element, wherein the fastening device is held in a second receiving receptacle of the socket element; and wherein the fastening device is a fastening device with shear off function, wherein the pin element exits the socket element upon a predefined threshold value of force acting on the pin element and/or the socket element,
the method comprising:
inserting the socket element into the second channel so that the palm part extends from the first channel into the second channel; and
inserting the pin element through the first channel into the socket element for forming the emergency break cable lug device.

7. The method according to claim 6, further comprising connecting at least a first cable and a second cable to each other with the cable lug device,
   wherein the method further includes fixing the first cable to a fixing part of the pin element and aligning a palm part of the socket element to the second cable, after the pin element has been inserted in the socket element.

* * * * *